United States Patent
Zhou (10) Patent No.: US 9,402,205 B2
(45) Date of Patent: Jul. 26, 2016

(54) TRAFFIC FORWARDING METHOD AND SYSTEM BASED ON VIRTUAL SWITCH CLUSTER

(71) Applicant: ZTE Corporation, Shenzhen, Guangdong (CN)

(72) Inventor: Zhe Zhou, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 14/410,291

(22) PCT Filed: Jul. 15, 2013

(86) PCT No.: PCT/CN2013/079408
§ 371 (c)(1),
(2) Date: Dec. 22, 2014

(87) PCT Pub. No.: WO2014/012474
PCT Pub. Date: Jan. 23, 2014

(65) Prior Publication Data
US 2015/0319646 A1      Nov. 5, 2015

(30) Foreign Application Priority Data

Jul. 19, 2012   (CN) .......................... 2012 1 0250246

(51) Int. Cl.
*H04W 28/08*       (2009.01)
*H04L 12/931*      (2013.01)
(Continued)

(52) U.S. Cl.
CPC ............. *H04W 28/08* (2013.01); *H04L 41/085* (2013.01); *H04L 41/0893* (2013.01); *H04L 41/0896* (2013.01); *H04L 43/0876* (2013.01); *H04L 49/70* (2013.01); *H04W 84/20* (2013.01)

(58) Field of Classification Search
CPC ... H04L 41/085; H04L 41/0896; H04L 49/70; H04W 28/08; H04W 84/20
USPC ......................................................... 370/237
See application file for complete search history.

(56) References Cited

U.S. PATENT DOCUMENTS 8,767,722 B2 *   7/2014   Kamble ................ H04L 49/356
                                                             370/360
2003/0026291 A1   2/2003   Engel
(Continued)

FOREIGN PATENT DOCUMENTS

CN         101222425 A      7/2008
CN         101399681 A      4/2009
(Continued)

OTHER PUBLICATIONS

International Search Report in international application No. PCT/CN2013/079408, mailed on Oct. 24, 2013.
(Continued)

*Primary Examiner* — Stephen J Clawson
(74) *Attorney, Agent, or Firm* — Oppedahl Patent Law Firm LLC (57) ABSTRACT

A traffic forwarding method and system based on a virtual switch cluster is described. The method includes setting an aggregation group member list to store information about all the members of an aggregation group; setting an aggregation group traffic forwarding member list to store information of aggregation group members for forwarding traffic, wherein the list in an initial state only containing information about local members of the aggregation group; and when it is determined that traffic of a physical device exceeds the total bandwidth of the members in the aggregation group traffic forwarding member list or a threshold value related to the total bandwidth, selecting a nonlocal member from the aggregation group member list and adding the same into the aggregation group traffic forwarding member list, and forwarding traffic according to the changed aggregation group traffic forwarding member list.

18 Claims, 5 Drawing Sheets

(51) Int. Cl.
*H04L 12/24* (2006.01)
*H04L 12/26* (2006.01)
*H04W 84/20* (2009.01)

(56) References Cited

U.S. PATENT DOCUMENTS

| | | | |
|---|---|---|---|
| 2003/0131192 A1 | 7/2003 | Nakamura | |
| 2009/0092043 A1* | 4/2009 | Lapuh | |
| 2010/0214949 A1* | 8/2010 | Smith | H04L 45/586 370/254 |
| 2010/0290473 A1* | 11/2010 | Enduri | H04L 49/70 370/395.53 |
| 2011/0035494 A1* | 2/2011 | Pandey | G06F 9/5077 709/224 |
| 2011/0075664 A1* | 3/2011 | Lambeth | H04L 45/04 370/390 |
| 2011/0255538 A1* | 10/2011 | Srinivasan | H04L 41/0893 370/392 |
| 2011/0274114 A1* | 11/2011 | Dhar | H04L 49/70 370/401 |
| 2012/0113835 A1* | 5/2012 | Alon | H04L 43/0817 370/252 |
| 2012/0307658 A1* | 12/2012 | Xia | H04L 47/122 370/252 |
| 2013/0094357 A1* | 4/2013 | Sankar | H04L 45/586 370/230 |
| 2013/0155902 A1* | 6/2013 | Feng | H04L 67/1031 370/255 |
| 2013/0242990 A1* | 9/2013 | Basso | H04L 12/185 370/390 |
| 2013/0250829 A1* | 9/2013 | Kurokawa | H04L 12/12 370/311 |

FOREIGN PATENT DOCUMENTS

| | | |
|---|---|---|
| CN | 101822006 A | 9/2010 |
| CN | 102143042 A | 8/2011 |
| CN | 102447636 A | 5/2012 |
| CN | 102769568 A | 11/2012 |
| EP | 1244256 A2 | 9/2002 |
| JP | 2003208267 A | 7/2003 |

OTHER PUBLICATIONS

English Translation of the Written Opinion of the International Search Authority in international application No. PCT/CN2013/079408, mailed on Oct. 24, 2013.
Supplementary European Search Report in European application No. 13820693.3, mailed on May 15, 2015.
Virtual networking, Dec. 13, 2010.

* cited by examiner

TRAFFIC FORWARDING METHOD AND SYSTEM BASED ON VIRTUAL SWITCH CLUSTER

TECHNICAL FIELD

The disclosure relates to the field of data communications, and more particularly to a traffic forwarding method and system based on a virtual switch cluster.

BACKGROUND

A Virtual Switch Cluster (VSC) is application of a network virtualization technology, which is generally connecting multiple separately running physical devices to form a virtual united device through stack plates. These physical devices find each other through a topology protocol, and select a master device and slave devices according to a policy. There is only one master device in the VSC scene, and the other devices are slave devices.

Because multiple physical devices are virtualized to become one device, ports on different physical devices may be aggregated into one logical port. An aggregation port may also be configured through a multi-port link aggregation command in the VSC scene, similar to in a single-device environment.

However, the aggregation port in the single-device environment performs traffic sharing completely among all the member ports belonging to the aggregation group based on a hash policy set by users, and bandwidth for stack links among devices in a VSC environment is very limited, so the limitation of the bandwidth of stack links among devices should be considered for the traffic sharing of a cross-device aggregation link; if a traffic sharing policy in the single-device environment is applied to the VSC scene, and load sharing is still performed at all the member ports belonging to the aggregation group, the traffic forwarding performance is likely to be influenced due to the limited bandwidth of stack links.

SUMMARY

In view of this, a traffic forwarding method and system based on a virtual switch cluster are provided, which ensure the traffic forwarding performance in a virtual switch cluster scene.

To this end, a technical solution of the disclosure is implemented as follows.

A traffic forwarding method based on a virtual switch cluster includes: respectively setting an aggregation group member list and an aggregation group traffic forwarding member list for a physical device in a virtual switch cluster, wherein the aggregation group member list stores information about all the members of an aggregation group, the aggregation group traffic forwarding member list stores information of aggregation group members for forwarding traffic of the physical device, and in an initial state the aggregation group traffic forwarding member list only contains information about local members of the aggregation group;

the method further includes: when it is determined that the traffic of the physical device exceeds the total bandwidth of the members in the aggregation group traffic forwarding member list corresponding to the physical device or a threshold value related to the total bandwidth of the members in the aggregation group traffic forwarding member list, selecting a nonlocal member from the aggregation group member list and adding the selected nonlocal member into the aggregation group traffic forwarding member list, and forwarding traffic according to the changed aggregation group traffic forwarding member list.

Selecting a nonlocal member from the aggregation group member list and adding the selected nonlocal member into the aggregation group traffic forwarding member list may include:

acquiring a difference set between the aggregation group member list and the aggregation group traffic forwarding member list; and selecting at least one member of the aggregation group from the difference set and adding the selected at least one member of the aggregation group into the aggregation group traffic forwarding member list, wherein remaining bandwidth of the selected at least one member of the aggregation group is not smaller than that of any remaining member of the aggregation group in the difference set.

The method further may include:

when it is determined that the aggregation group traffic forwarding member list corresponding to the physical device contains a nonlocal member of the aggregation group, and the traffic forwarded from the nonlocal member of aggregation group is smaller than the sum of remaining bandwidth of all the members of the aggregation group except the nonlocal member of aggregation group in the aggregation group traffic forwarding member list, removing the nonlocal member of the aggregation group from the aggregation group traffic forwarding member list.

The method further may include:

when a failure occurs at a member of aggregation group, removing information of the member of the aggregation group from the aggregation group member list, or from the aggregation group member list and the aggregation group traffic forwarding member list.

The method further may include:

after the member of the aggregation group in failure returned to normal, and when it is determined that the member of the aggregation group is a local member of aggregation group of the physical device, adding the information of the member of the aggregation group into the aggregation group member list and the aggregation group traffic forwarding member list corresponding to the physical device; when it is determined that the member of the aggregation group is a nonlocal member of the aggregation group of the physical device, adding the information of the member of the aggregation group into the aggregation group member list corresponding to the physical device.

A traffic forwarding system based on a virtual switch cluster includes a setting module, a traffic monitoring module, a traffic sharing module and a traffic forwarding module; wherein the setting module is configured to set an aggregation group member list and an aggregation group traffic forwarding member list; wherein the aggregation group member list stores information about all the members of an aggregation group, the aggregation group traffic forwarding member list stores information of members of the aggregation group member for forwarding traffic of a physical device, and in an initial state the aggregation group traffic forwarding member list only contains information about local members of the aggregation group;

the traffic monitoring module is configured to determine the traffic of the physical device in the virtual switch cluster;

the traffic sharing module is configured to, when the traffic of the physical device exceeds the total bandwidth of the members in the aggregation group traffic forwarding member list corresponding to the physical device or a threshold value related to the total bandwidth of the members in the aggregation group traffic forwarding member list, select a nonlocal member from the aggregation group member list and add the selected nonlocal member into the aggregation group traffic forwarding member list; and the traffic forwarding module is configured to forward traffic according to the changed aggregation group traffic forwarding member list.

The traffic sharing module is configured to acquire a difference set between the aggregation group member list and the aggregation group traffic forwarding member list, and select at least one member of the aggregation group from the difference set and add the selected at least one member of the aggregation group into the aggregation group traffic forwarding member list, wherein remaining bandwidth of the selected at least one member of the aggregation group is not smaller than that of any remaining member of the aggregation group in the difference set.

The system further may include an optimizing module, wherein the optimizing module is configured to, when it is determined that the aggregation group traffic forwarding member list corresponding to the physical device contains a nonlocal member of the aggregation group, and the traffic forwarded from the nonlocal member of the aggregation group is smaller than the sum of remaining bandwidth of all the members of the aggregation group except the nonlocal member of the aggregation group in the aggregation group traffic forwarding member list, remove the nonlocal member of the aggregation group from the aggregation group traffic forwarding member list.

The system further may include a failure processing module, wherein the failure processing module is configured to, when a failure occurs at a member of the aggregation group, remove information of the member of the aggregation group from the aggregation group member list, or remove the information of the member of the aggregation group from the aggregation group member list and the aggregation group traffic forwarding member list.

The failure processing module is further configured to, after the member of the aggregation group in failure returned to normal, and when it is determined that the member of the aggregation group is a local member of aggregation group of the physical device, add the aggregation group member information into the aggregation group member list and the aggregation group traffic forwarding member list corresponding to the physical device; the failure processing module is further configured to, when it is determined that the member of the aggregation group is a nonlocal member of the aggregation group of the physical device, add the information of the member of the aggregation group into the aggregation group member list corresponding to the physical device.

The traffic forwarding method and system based on a virtual switch cluster according to the embodiments of the disclosure include: respectively setting an aggregation group member list and an aggregation group traffic forwarding member list for a physical device in the virtual switch cluster, wherein the aggregation group member list stores information about all the members of an aggregation group, the aggregation group traffic forwarding member list stores information of aggregation group members for forwarding traffic of the physical device, and the aggregation group traffic forwarding member list in an initial state only contains information about local members of the aggregation group; the traffic forwarding method and system based on a virtual switch cluster of the disclosure further include: when it is determined that the traffic of the physical device exceeds the total bandwidth of the members in the aggregation group traffic forwarding member list corresponding to the physical device or a threshold value related to the total bandwidth of the members in the aggregation group traffic forwarding member list, selecting a nonlocal member from the aggregation group member list and adding the same into the aggregation group traffic forwarding member list, and forwarding traffic according to the changed aggregation group traffic forwarding member list. The disclosure can implement traffic forwarding in a virtual switch cluster scene on the premise of occupying limited bandwidth of a stack link as small as possible, thereby ensuring the traffic forwarding performance in the virtual switch cluster scene.

DETAILED DESCRIPTION

In the embodiments of the disclosure, an aggregation group member list and an aggregation group traffic forwarding member list are respectively set for a physical device in a virtual switch cluster; in an initial state, a local member is selected from the aggregation group member list, and then added into the aggregation group traffic forwarding member list; when it is determined that the traffic of a physical device is smaller than the total bandwidth of the members in the aggregation group traffic forwarding member list corresponding to the physical device or than a threshold value related to the total bandwidth of the members in the aggregation group traffic forwarding member list, a local member is selected from the aggregation group member list, and then added into the aggregation group traffic forwarding member list.

Figure 1:
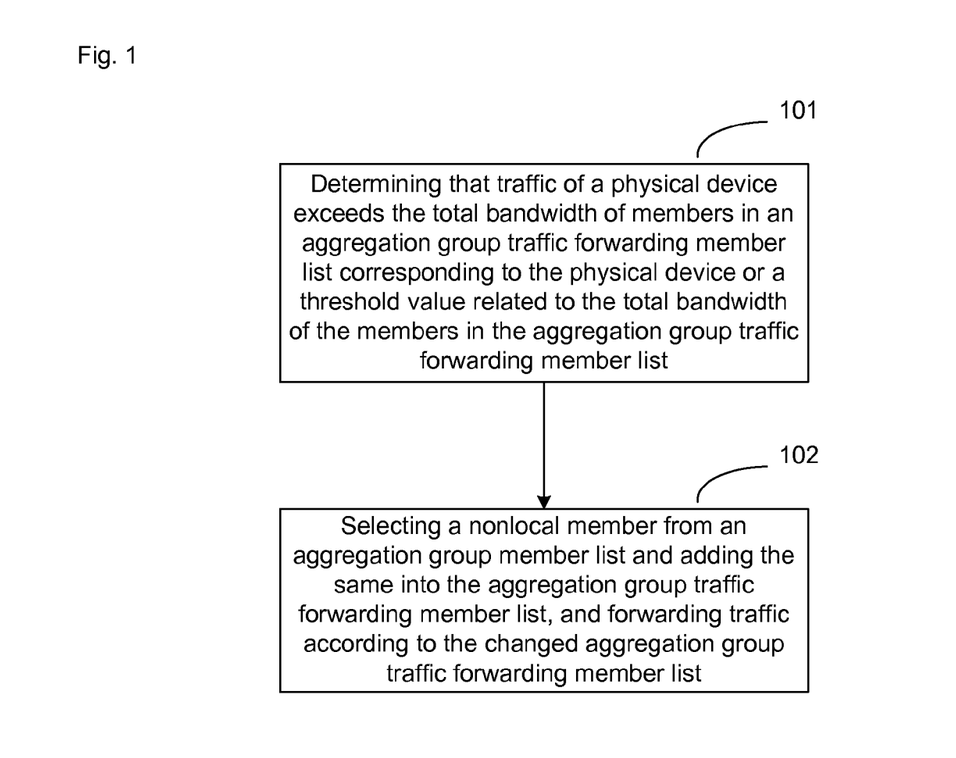
FIG. 1 is a flowchart of a traffic forwarding method based on a virtual switch cluster according to an embodiment of the disclosure.

FIG. 1 is a flowchart of a traffic forwarding method based on a virtual switch cluster according to an embodiment of the disclosure; as shown in FIG. 1, the method includes steps as follows.

Step 101: it is determined that the traffic of a physical device exceeds the total bandwidth of the members in the aggregation group traffic forwarding member list corresponding to the physical device or a threshold value related to the total bandwidth of the members in the aggregation group traffic forwarding member list.

In an embodiment of the disclosure, an aggregation group member list and an aggregation group traffic forwarding member list are respectively set for a physical device in a virtual switch cluster; the aggregation group member list stores information about all the members of the aggregation group, wherein the information generally refers to port information; the aggregation group traffic forwarding member list stores information of aggregation group members for forwarding traffic of the physical device. In other words, the aggregation group traffic forwarding member list is a subset of the aggregation group member list, and only the port/ports in the aggregation group traffic forwarding member list is/are qualified for forwarding traffic. The aggregation group traffic forwarding member list only contains information about local members of the aggregation group in an initial state; the local members of the aggregation group may also be called local device members.

Note that, the aggregation group member lists of all physical devices in the virtual switch cluster are the same, but different physical devices correspond to different aggregation group traffic forwarding member lists.

Step 102: a nonlocal member is selected from the aggregation group member list and added into the aggregation group traffic forwarding member list, and then traffic is forwarded according to the changed aggregation group traffic forwarding member list.

Optionally, selecting a nonlocal member from the aggregation group member list and adding the selected nonlocal member into the aggregation group traffic forwarding member list includes: acquiring a difference set between the aggregation group member list and the aggregation group traffic forwarding member list, and selecting at least one member of the aggregation group from the difference set and adding the selected member of the aggregation group into the aggregation group traffic forwarding member list, wherein remaining bandwidth of the selected member of aggregation group is not smaller than that of any remaining member of the aggregation group in the difference set.

Optionally, the method further includes: when it is determined that the aggregation group traffic forwarding member list corresponding to the physical device contains a nonlocal member of the aggregation group, and the traffic forwarded from the nonlocal member of the aggregation group is smaller than the sum of remaining bandwidth of all the members of the aggregation group except the nonlocal member of the aggregation group in the aggregation group traffic forwarding member list, the nonlocal member of aggregation group is removed from the aggregation group traffic forwarding member list.

Optionally, the method further includes: when a failure occurs at a member of the aggregation group, removing information of the failure member of the aggregation group from the aggregation group member list, or from the aggregation group member list and the aggregation group traffic forwarding member list.

Specifically, if only the aggregation group member list contains the information of the failure member of the aggregation group, the information of the failure member of the aggregation group is deleted from the aggregation group member list; if both the aggregation group member list and the aggregation group traffic forwarding member list contain the information of the failure member of the aggregation group, the information of the failure member of the aggregation group is deleted from both the aggregation group member list and the aggregation group traffic forwarding member list.

Optionally, the method further includes: after the failure member of the aggregation group returned to normal, and when it is determined that the aggregation group member recovered is a local member of the aggregation group of the physical device, information of the aggregation group member recovered is then added into the aggregation group member list and the aggregation group traffic forwarding member list corresponding to the physical device; when it is determined that the aggregation group member recovered is a nonlocal member of the aggregation group of the physical device, information of the aggregation group member recovered is then added into the aggregation group member list corresponding to the physical device.

Figure 2:
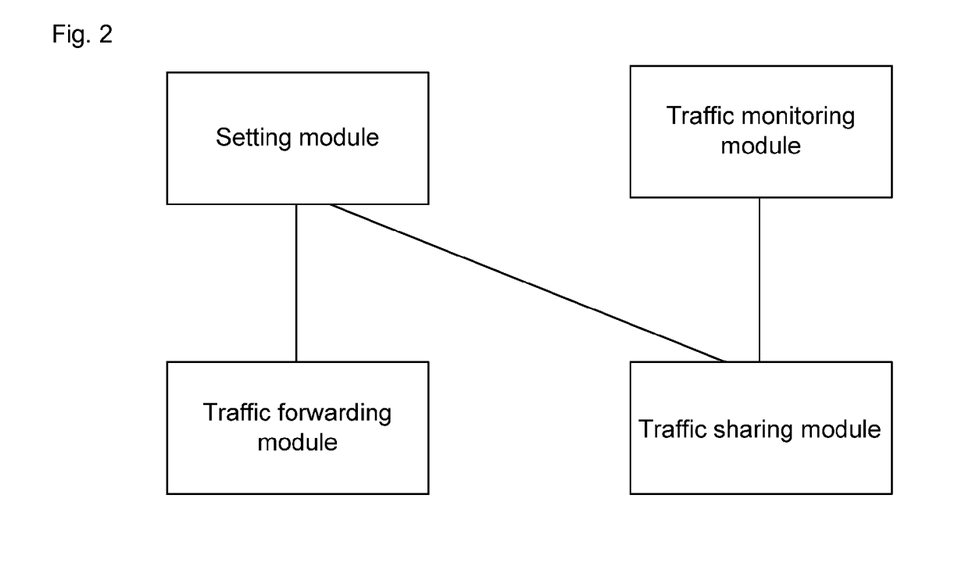
FIG. 2 is a structure diagram of a traffic forwarding system based on a virtual switch cluster according to an embodiment of the disclosure.

Correspondingly, an embodiment of the disclosure also provides a traffic forwarding system based on a virtual switch cluster; FIG. 2 is a structure diagram of a traffic forwarding system based on a virtual switch cluster according to an embodiment of the disclosure; as shown in FIG. 2, the system includes a setting module, a traffic monitoring module, a traffic sharing module and a traffic forwarding module; wherein, the setting module may be a processor, and configured to set an aggregation group member list and an aggregation group traffic forwarding member list; wherein the aggregation group member list stores information about all the members of the aggregation group, the aggregation group traffic forwarding member list stores information of aggregation group members for forwarding traffic of the physical device, and in an initial state the aggregation group traffic forwarding member list only contains information about local members of the aggregation group;

the traffic monitoring module may be implemented as a monitor, and configured to determine the traffic of the physical device in the virtual switch cluster; the traffic monitoring module counts traffic at each member port in an aggregation link in real time, wherein the traffic generally refers to traffic sent to the each port by each physical device;

the traffic sharing module may be implemented as a processor, and configured to reassign the aggregation group traffic forwarding member list according to a result obtained by the traffic monitoring module; specifically, the traffic sharing module is configured to, when the traffic of the physical device exceeds the total bandwidth of the members in the aggregation group traffic forwarding member list corresponding to the physical device or a threshold value related to the total bandwidth of the members in the aggregation group traffic forwarding member list, select a nonlocal member from the aggregation group member list and add the selected nonlocal member into the aggregation group traffic forwarding member list;

the traffic forwarding module may be implemented as a processor, and configured to forward traffic according to the changed aggregation group traffic forwarding member list.

Optionally, the traffic sharing module is specifically configured to acquire a difference set between the aggregation group member list and the aggregation group traffic forwarding member list, and select at least one member of the aggregation group from the difference set and add the selected member of the aggregation group into the aggregation group traffic forwarding member list, wherein remaining bandwidth of the selected member of aggregation group is not smaller than that of any remaining member of the aggregation group in the difference set.

Figure 3:
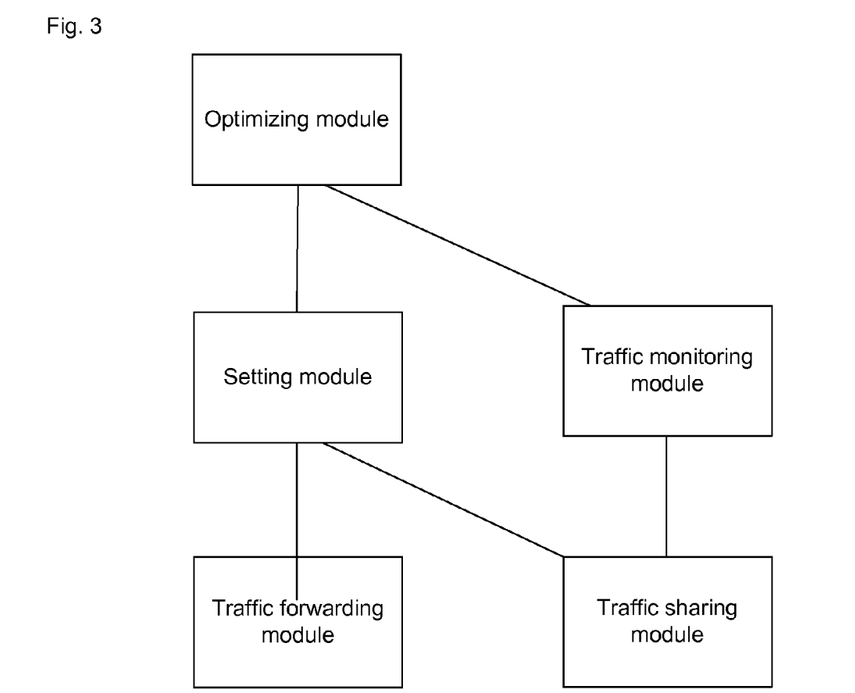
FIG. 3 is a structure diagram of a traffic forwarding system based on a virtual switch cluster in another embodiment of the disclosure.

FIG. 3 is a structure diagram of a traffic forwarding system based on a virtual switch cluster in another embodiment of the disclosure; as shown in FIG. 3, the system further includes an optimizing module;

the optimizing module may be implemented as a processor, and configured to, when it is determined that the aggregation group traffic forwarding member list corresponding to the physical device contains a nonlocal member of aggregation group, and the traffic forwarded from the nonlocal member of the aggregation group is smaller than the sum of remaining bandwidth of all the members of aggregation group except the nonlocal member of the aggregation group in the aggregation group traffic forwarding member list, remove the nonlocal member of the aggregation group from the aggregation group traffic forwarding member list.

Figure 4:
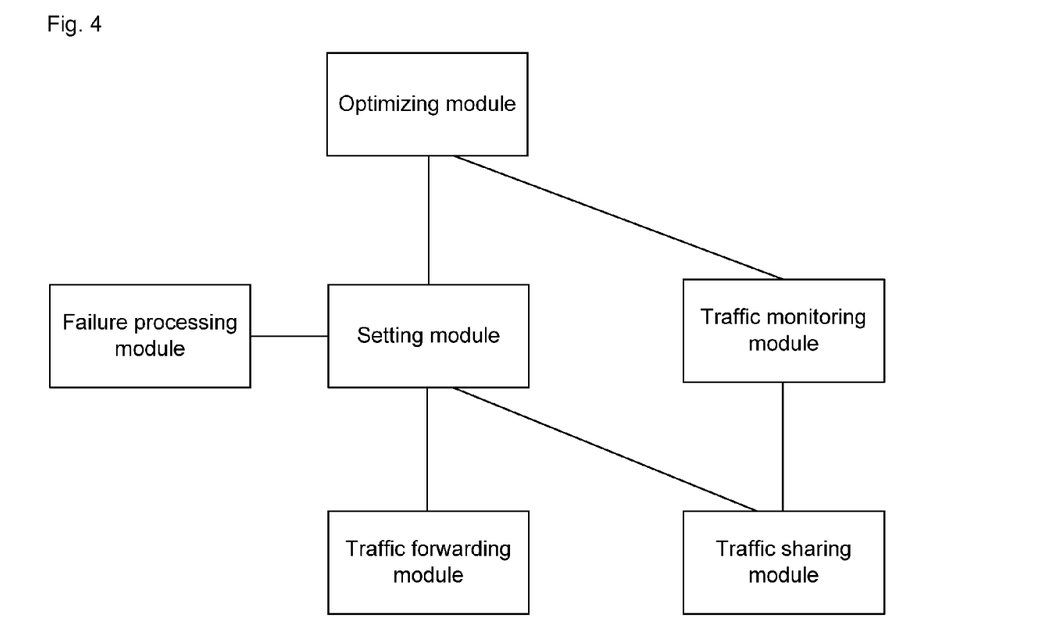
FIG. 4 is a structure diagram of a traffic forwarding system based on a virtual switch cluster in a still another embodiment of the disclosure.

FIG. 4 is a structure diagram of a traffic forwarding system based on a virtual switch cluster in still another embodiment of the disclosure; as shown in FIG. 4, the system further includes a failure processing module;

the failure processing module may be implemented as a processor, and configured to, when a failure occurs at a member of the aggregation group, remove information of the failure member of the aggregation group from the aggregation group member list, or from the aggregation group member list and the aggregation group traffic forwarding member list.

The failure processing module needs to monitor the link state of each port in the aggregation group member list in real time, so as to process a link failure and a failure recovery event at a port of a member of the aggregation group in time.

Optionally, the failure processing module is further configured to, after the failure member of the aggregation group returned to normal, and when it is determined that the aggregation group member recovered is a local member of aggregation group of the physical device, add the information of the aggregation group member recovered into the aggregation group member list and the aggregation group traffic forwarding member list corresponding to the physical device; the failure processing module is further configured to, when it is determined that the aggregation group member recovered is a nonlocal member of the aggregation group of the physical device, add the information of the aggregation group member recovered into the aggregation group member list corresponding to the physical device.

Note that, these modules in the traffic forwarding system based on a virtual switch cluster may be all or partly located at the physical device.

The disclosure is elaborated below in combination with specific embodiments.

In an embodiment, the VSC includes two physical devices, that is, a master device and a slave device; a link aggregation group member list contains four member ports, which are two ports of the master device plus two ports of the slave device.

Figure 5:
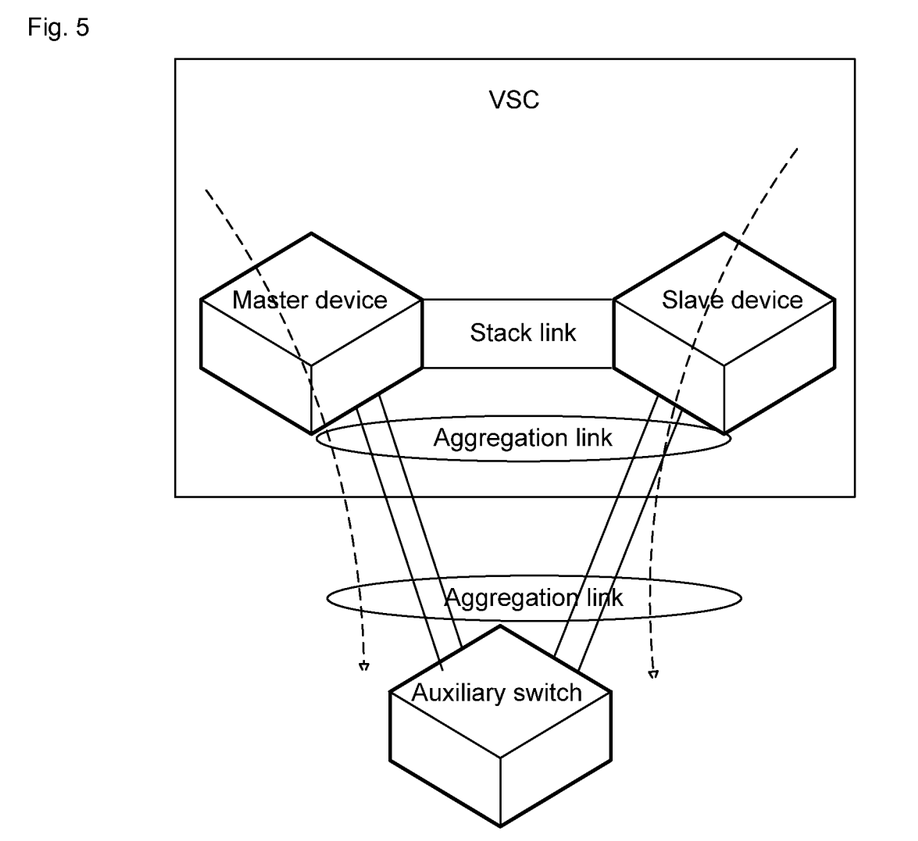
FIG. 5 is a diagram of a traffic forwarding policy in an initial state and when traffic does not exceed the total bandwidth of local members of an aggregation group in an embodiment of the disclosure.
Figure 6:
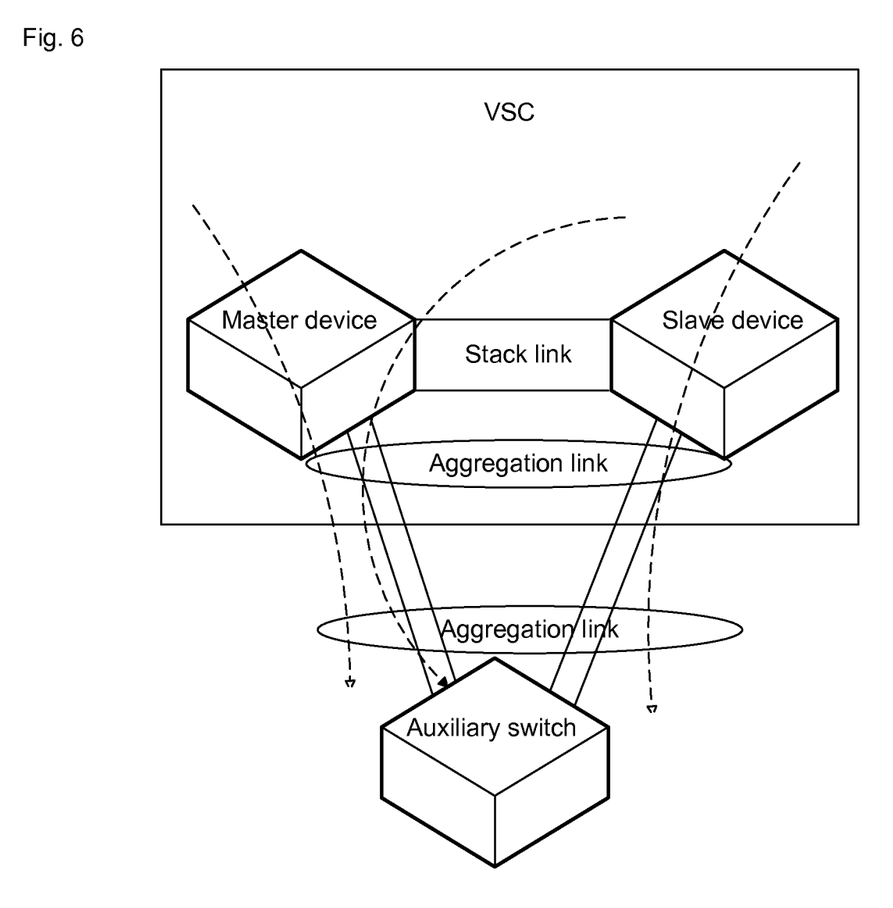
FIG. 6 is a diagram of a traffic forwarding policy when traffic of a slave device exceeds the total bandwidth of traffic forwarding members of an aggregation group in an embodiment of the disclosure.

FIG. 5 is a diagram of a traffic forwarding policy in an initial state and when traffic does not exceed the total bandwidth of local members of an aggregation group in an embodiment of the disclosure; as show in FIG. 5, the current traffic passing the master device is respectively forwarded by the local members of the aggregation group; FIG. 6 is a diagram of a traffic forwarding policy when traffic of a slave device exceeds the total bandwidth of traffic forwarding members of the aggregation group in an embodiment of the disclosure; as shown in FIG. 6, for the slave device, some nonlocal member ports in the aggregation group member list, such as the port of the master device, are added into the aggregation group traffic forwarding member list, the specific implementation steps are as follows:

the traffic monitoring module periodically monitors and records the current traffic of all member ports, namely the local ports and the nonlocal ports, in the link aggregation group member list.

When the traffic monitoring module finds that the traffic needing to be forwarded from the aggregation group exceeds the total bandwidth of the current aggregation group traffic forwarding members, the traffic monitoring module notifies the traffic sharing module of this finding and informs the traffic sharing module of extra bandwidth needed by the aggregation group.

The traffic sharing module selects a port according to the following policy:

a) acquiring a difference set between the aggregation group member list and the aggregation group traffic forwarding member list;

b) selecting a port with the maximum remaining bandwidth in the difference set, removing the selected port from the difference set and adding the selected port into set B;

c) counting the sum of remaining bandwidth of all the ports in set B, and comparing the sum with the needed extra bandwidth; if it is larger than the needed extra bandwidth, lookup ends; or else, returning to b) to continue looking up; and d) adding the ports in set B into the aggregation group traffic forwarding member list.

If the aggregation group traffic forwarding member list contains a nonlocal member port, and the traffic forwarded from the nonlocal port is smaller than the sum of remaining bandwidth of all the ports except the nonlocal port in the aggregation group traffic forwarding member list, then the nonlocal member port is removed from the aggregation group traffic forwarding member list. When the aggregation group traffic forwarding member list only contains local member ports, the operation ends. There may be one or multiple ports removed each time.

Figure 7:
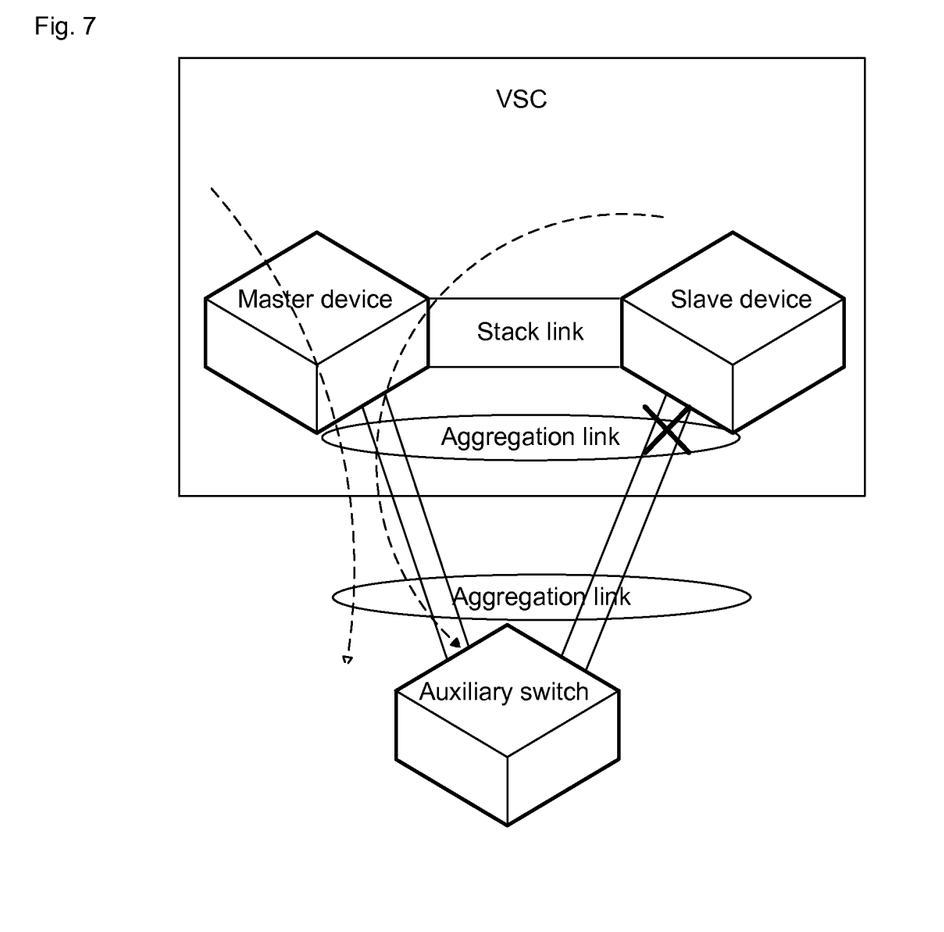
FIG. 7 is a diagram of a traffic forwarding policy when a failure occurs at a port of a member of an aggregation group in an embodiment of the disclosure.

In the present embodiment, when the failure processing module detects that a failure occurs at a port of a member of the aggregation group, it removes the failure member port from the aggregation group member list and the aggregation group traffic forwarding member list, and updates the aggregation group traffic forwarding member list according to the above policy. When the aggregation group traffic forwarding member list does not contain any local member port, the traffic is completely forwarded by the nonlocal member in the aggregation group member list, the corresponding traffic forwarding policy is shown in FIG. 7. After the failure port returned to normal, if the failure processing module determines that the aggregation group member recovered is a local member of the aggregation group of the physical device, the failure processing module adds the information of the aggregation group member recovered into the aggregation group member list and the aggregation group traffic forwarding member list corresponding to the physical device; if the failure processing module determined that the aggregation group member recovered is a nonlocal member of aggregation group of the physical device, the failure processing module adds the information of the aggregation group member recovered into the aggregation group member list corresponding to the physical device.

The above are only the preferred embodiments of the disclosure, and are not intended to limit the scope of protection of the claims of the disclosure.

What is claimed is:

1. A traffic forwarding method based on a virtual switch cluster, setting an aggregation group member list and an aggregation group traffic forwarding member list for a physical device in the virtual switch cluster, wherein the aggregation group member list stores information of all members of an aggregation group, the aggregation group traffic forwarding member list stores information of members of the aggregation group for forwarding traffic of the physical device, and the aggregation group traffic forwarding member list in an initial state only contains information of local members of the aggregation group;

the method comprising: when it is determined that traffic of the physical device exceeds total bandwidth of the members in the aggregation group traffic forwarding member list corresponding to the physical device or a threshold value related to the total bandwidth of the members in the aggregation group traffic forwarding member list, selecting a nonlocal member from the aggregation group member list and adding the selected nonlocal member into the aggregation group traffic forwarding member list, and forwarding traffic according to the aggregation group traffic forwarding member list that has been changed.

2. The method according to claim 1, wherein the selecting a nonlocal member from the aggregation group member list and adding the selected nonlocal member into the aggregation group traffic forwarding member list comprises:

acquiring a difference set between the aggregation group member list and the aggregation group traffic forwarding member list; and selecting at least one member of the aggregation group from the difference set and adding the selected at least one member of the aggregation group into the aggregation group traffic forwarding member list, wherein remaining bandwidth of the selected at least one member of the aggregation group is not smaller than remaining bandwidth of any remaining member of the aggregation group in the difference set.

3. The method according to claim 2, further comprising:
when it is determined that the aggregation group traffic forwarding member list corresponding to the physical device contains a nonlocal member of the aggregation group, and traffic forwarded from the nonlocal member of the aggregation group is smaller than a sum of remaining bandwidth of all the members of the aggregation group, except the nonlocal member of the aggregation group, in the aggregation group traffic forwarding member list, removing the nonlocal member of the aggregation group from the aggregation group traffic forwarding member list.

4. The method according to claim 3, further comprising:
when a failure occurs at a member of aggregation group, removing information of the member of the aggregation group from the aggregation group member list, or removing the information of the member of the aggregation group from the aggregation group member list and the aggregation group traffic forwarding member list.

5. The method according to claim 4, further comprising:
after the member of the aggregation group in failure returned to normal, and when it is determined that the member of the aggregation group is a local member of the aggregation group of the physical device, adding the information of the member of the aggregation group into the aggregation group member list and the aggregation group traffic forwarding member list corresponding to the physical device; when it is determined that the member of the aggregation group is a nonlocal member of the aggregation group of the physical device, adding the information of the member of the aggregation group into the aggregation group member list corresponding to the physical device.

6. The method according to claim 2, further comprising:
when a failure occurs at a member of aggregation group, removing information of the member of the aggregation group from the aggregation group member list, or removing the information of the member of the aggregation group from the aggregation group member list and the aggregation group traffic forwarding member list.

7. The method according to claim 6, further comprising:
after the member of the aggregation group in failure returned to normal, and when it is determined that the member of the aggregation group is a local member of the aggregation group of the physical device, adding the information of the member of the aggregation group into the aggregation group member list and the aggregation group traffic forwarding member list corresponding to the physical device; when it is determined that the member of the aggregation group is a nonlocal member of the aggregation group of the physical device, adding the information of the member of the aggregation group into the aggregation group member list corresponding to the physical device.

8. The method according to claim 1, further comprising:
when a failure occurs at a member of aggregation group, removing information of the member of the aggregation group from the aggregation group member list, or removing the information of the member of the aggregation group from the aggregation group member list and the aggregation group traffic forwarding member list.

9. The method according to claim 8, further comprising:
after the member of the aggregation group in failure returned to normal, and when it is determined that the member of the aggregation group is a local member of the aggregation group of the physical device, adding the information of the member of the aggregation group into the aggregation group member list and the aggregation group traffic forwarding member list corresponding to the physical device; when it is determined that the member of the aggregation group is a nonlocal member of the aggregation group of the physical device, adding the information of the member of the aggregation group into the aggregation group member list corresponding to the physical device.

10. A traffic forwarding system based on a virtual switch cluster, comprising a processor configured to be capable of executing the stored programming instructions to perform steps comprising:

setting an aggregation group member list and an aggregation group traffic forwarding member list; wherein the aggregation group member list stores information of all members of an aggregation group, the aggregation group traffic forwarding member list stores information of members of the aggregation group member for forwarding traffic of a physical device, and the aggregation group traffic forwarding member list in an initial state only contains information of local members of the aggregation group;

when traffic of the physical device exceeds total bandwidth of members in the aggregation group traffic forwarding member list corresponding to the physical device or a threshold value related to the total bandwidth of the members in the aggregation group traffic forwarding member list, selecting a nonlocal member from the aggregation group member list and add the selected nonlocal member into the aggregation group traffic forwarding member list; and forwarding traffic according to the aggregation group traffic forwarding member list that has been changed.

11. The system according to claim 10, wherein the processor configured to be capable of executing the stored programming instructions to perform steps further comprising:

acquiring a difference set between the aggregation group member list and the aggregation group traffic forwarding member list, and selecting at least one member of the aggregation group from the difference set and add the selected at least one member of the aggregation group into the aggregation group traffic forwarding member list, wherein remaining bandwidth of the selected at least one member of the aggregation group is not smaller than remaining bandwidth of any remaining member of the aggregation group in the difference set.

12. The system according to claim 11, wherein the processor configured to be capable of executing the stored programming instructions to perform steps further comprising: when a failure occurs at a member of the aggregation group, removing information of the member of the aggregation group from the aggregation group member list, or removing the information of the member of the aggregation group from the aggregation group member list and the aggregation group traffic forwarding member list.

13. The system according to claim 12, wherein the processor configured to be capable of executing the stored programming instructions to perform steps further comprising: after the member of the aggregation group in failure returned to normal, and when it is determined that the member of the aggregation group is a local member of the aggregation group of the physical device, adding the information of the member of the aggregation group into the aggregation group member list and the aggregation group traffic forwarding member list corresponding to the physical device;

when it is determined that the member of the aggregation group is a nonlocal member of the aggregation group of the physical device, adding the information of the member of the aggregation group into the aggregation group member list corresponding to the physical device.

14. The system according to claim 10, wherein the processor configured to be capable of executing the stored programming instructions to perform steps further comprising: when it is determined that the aggregation group traffic forwarding member list corresponding to the physical device contains a nonlocal member of the aggregation group, and traffic forwarded from the nonlocal member of the aggregation group is smaller than a sum of remaining bandwidth of all the members of the aggregation group, excepting the nonlocal member of the aggregation group, in the aggregation group traffic forwarding member list, remove the nonlocal member of the aggregation group from the aggregation group traffic forwarding member list.

15. The system according to claim 12, wherein the processor configured to be capable of executing the stored programming instructions to perform steps further comprising: when a failure occurs at a member of the aggregation group, removing information of the member of the aggregation group from the aggregation group member list, or removing the information of the member of the aggregation group from the aggregation group member list and the aggregation group traffic forwarding member list.

16. The system according to claim 15, wherein the processor configured to be capable of executing the stored programming instructions to perform steps further comprising:

after the member of the aggregation group in failure returned to normal, and when it is determined that the member of the aggregation group is a local member of the aggregation group of the physical device, adding the information of the member of the aggregation group into the aggregation group member list and the aggregation group traffic forwarding member list corresponding to the physical device;

when it is determined that the member of the aggregation group is a nonlocal member of the aggregation group of the physical device, adding the information of the member of the aggregation group into the aggregation group member list corresponding to the physical device.

17. The system according to claim 10, wherein the processor configured to be capable of executing the stored programming instructions to perform steps further comprising: when a failure occurs at a member of the aggregation group, removing information of the member of the aggregation group from the aggregation group member list, or removing the information of the member of the aggregation group from the aggregation group member list and the aggregation group traffic forwarding member list.

18. The system according to claim 17, wherein the processor configured to be capable of executing the stored programming instructions to perform steps further comprising:

after the member of the aggregation group in failure returned to normal, and when it is determined that the member of the aggregation group is a local member of the aggregation group of the physical device, adding the information of the member of the aggregation group into the aggregation group member list and the aggregation group traffic forwarding member list corresponding to the physical device;

when it is determined that the member of the aggregation group is a nonlocal member of the aggregation group of the physical device, adding the information of the member of the aggregation group into the aggregation group member list corresponding to the physical device.

* * * * *